United States Patent Office 2,943,016
Patented June 28, 1960

2,943,016

METHOD OF DESTROYING BACTERIA EMPLOYING SUBSTITUTED XYLENES

Irving Rosen and Frank B. Slezak, Painesville, Ohio, assignors to Diamond Alkali Company, Cleveland, Ohio, a corporation of Delaware No Drawing. Filed Apr. 30, 1958, Ser. No. 731,862

14 Claims. (Cl. 167—30)

The present invention relates to improvements in materials active in combating fungal and bacterial growth and more particularly to methods of controlling fungal and bacterial growth by contacting these organisms with an active amount of the compounds of the present invention.

Since the introduction of the Bordeaux mixture, many organic and inorganic fungicides and bactericides have been employed; however, in most instances, certain disadvantages to these various compounds have developed, such as cost of production, toxicity to desired plants, non-selectivity and the difficulty of preparation.

It is a principal object of the present invention to produce a new series of compounds which overcome certain of these disadvantages.

Another object of this invention is to prepare new compositions which are active in combating or killing bacteria and fungi.

Other objects and advantages of the biologically active materials of the present invention will be apparent to those skilled in the art from the following description.

This invention comprises compositions active in controlling bacterial and fungal growth comprising a carrier and an active amount of a compound selected from the group consisting of:

Alpha, alpha'-diiodo-p-xylene
Alpha, alpha'-dithiocyano-p-xylene
Alpha, alpha'-dibromo-p-xylene
Alpha, alpha'-dibromo-m-xylene
Alpha, alpha'-diiodo-m-xylene
Alpha, alpha'-dithiocyano-m-xylene
Alpha, alpha'-dibromo-o-xylene
Alpha, alpha'-diido-o-xylene
Alpha, alpha'-dithiocyano-o-xylene
Alpha, alpha'-dichloro-m-xylene
Alpha, alpha, alpha'-trichloro-p-xylene
2-bromo-p-xylene
2,4-dichloro-m-xylene and methods involving the use of such compositions.

The fungicidal and bactericidal compounds of the present invention may be prepared by methods disclosed in the art such as chlorination, methylation or halomethylation reactions. Although the preparation of these compounds is disclosed in various references, they may be found in the following: H. Finkelstein, Berichte 43, p. 1528. Shirley, Preparation of Organic Intermediates, p. 105, and in the following Chemical Abstracts references:

Vol. 4, p. 2441 (1910).
Vol. 5, pp. 884 and 885 (1911).
Vol. 40, p. 5406 (1946).
Vol. 41, p. 1213f (1947).
Vol. 47, p. 8057 (1953).

It will be understood, of course, that the compounds of the present invention may be utilized in diverse formulations, both liquid and solid, including finely-divided powders and granular materials, solutions, concentrates, emulsifiable concentrates, slurries and the like, depending upon the biological application intended and the formulation medium desired. Thus it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina silica materials and incorporating liquid solvents, diluents, etc., typically water and various organic liquids, such as kerosene, benzene, toluene, xylene, cyclohexanone and other petroleum distillate fractions or mixtures thereof. When liquid formulations are employed, or dry materials prepared which are to be used in liquid form, it is desirable in certain instances to additionally employ a wetting, emulsifying, or dispersing agent to facilitate use of the formulation, suitable surface active agents being set out, e.g., in an article by John W. McCutcheon in Soap and Chemical Specialties, vol. 31, Nos. 7–10 (1955).

The term "carrier" as employed in the specification and claims is intended to refer broadly to the materials constituting a major proportion of a biologically active or other formulation and hence includes finely-divided material, both liquids and solids, as aforementioned, conventionally used in such applications.

The compounds of the present invention may be used alone or in combination with other known biologically active materials, such as chlorinated hydrocarbons, organic phosphorous compounds, foliage and soil fungicides, pre- and post-emergent herbicides and the like.

The term "fungicide" as used in the specification and claims is intended to refer broadly to a composition of matter effective in controlling or killing, collectively or selectively, fungus growth which is either parasitic or saprophytic, specifically the control of fungus spore germination, blight infestation, e.g., control of early and late blight disease, and control of blight and mildew infestation, i.e., the protection of plants by contacting the soil around the plants with a fungicidal amount of a compound within the scope of the invention, and the protection of seeds and seedlings, i.e., the protection of seeds and seedlings from seed decay and damping off fungi; moreover, it is preferred that the fungus be contacted with a fungicidal amount of the composition.

In order to demonstrate this fungicidal activity, a series of tests is run incorporating evaluations of the fungicidal effectiveness of compounds within the scope of this invention against (A) fungus spore germination, i.e., the spore germinatino of *Alternaria oleracea* and *Monilinia fructicola*, (B) blight fungi, i.e., the early and late blight fungi, (C) fungi-caused seed and seedling disease, i.e., the protection of seeds and seedlings from seed decay and damping off fungi.

The procedures of fungicidal evaluations A through C are as follows; the data resulting being found in Table I.

The procedure in fungicidal evaluation A above concerning the fungicidal spore germination against *Alternaria oleracea* and *Monilinia fructicola* is:

Spore germination tests on glass slides are conducted via the test tube dilution method adopted from the procedure recommended by the American Phytopathological Society's committee on standardization of fungicidal tests. In this procedure, the test chemical in aqueous formulations at concentrations of 1000, 100, 10 and 1.0 p.p.m. is tested for its ability to inhibit germination of spores from 7 to 10 day old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. Each test compound is given a rating which corresponds to the concentration that inhibits germination of half the spores (ED 50 value): AA equals less than 1.0 p.p.m.; A equals 1.0–10 p.p.m.; B equals 10–100 p.p.m.; C equals 100–1000 p.p.m.; D equals greater than 1000 p.p.m. These ratings are used in Table I.

The procedure in fungicidal evaluation B above, concerning early blight control, is:

A tomato foliage disease test is conducted measuring the ability of the test compound to protect tomato foliage against infection of the early blight fungus *Alternaria solani*. Tomato plants 5 to 7 inches high of the variety Bonny Best are employed. The plants are sprayed with 100 ml. of test formulation at 2000 p.p.m. and 400 p.p.m. test chemical (in combination with 5% acetone–0.01% Triton X–155—balance water) at 40 lbs. air pressure while being rotated on a turntable in a spray chamber. After the spray deposit is dry, the treated plants and comparable untreated controls are sprayed with a spore suspension containing approximately 20,000 conidia of *Alternaria solani* per ml. The plants are held in a 100% humid atmosphere for 24 hours at 70° F. to permit spore germination and infection. After 2 to 4 days, lesion counts are made on the three uppermost fully expanded leaves. Percent disease control based on the number of lesions obtained on the control plants is given in Table I.

The procedure in fungicidal evaluation B above, concerning late blight control, is:

Fungicidal utility is demonstrated by the ability of the test compound to protect tomato plants against the late blight fungus, *Phytophthora infestans*. The method employs tomato plants 5 to 7 inches high of the variety Bonny Best. 100 ml. of the test formulation (2000 p.p.m. and 400 p.p.m. test chemical—5% acetone—0.01% Triton X–155—balance water) are sprayed on the plants at 40 lbs. air pressure while the plants are being rotated on a turntable in a spray chamber. After the spray deposit is dry, the treated plants and comparable untreated controls are sprayed with approximately 150,000 sporangia of *Phytophthora infestans* per ml. The plants are held in a 100% humid atmosphere for 24 hours at 60° F. to permit spore germination and infection. After 2 to 4 days, lesion counts are made on the three uppermost full expanded leaves. Comparing the number of lesions on the test plants and control plants indicate percent disease control compiled in Table I.

The procedure in fungicidal evaluation C above, concerning the protection of seeds and seedlings from seed decay and damping off fungi, is:

In this test soil infested with seed decay and damping off fungi in 4" x 4" x 3" plant band boxes is treated by a soil drench-mix method at the rate equivalent to 128 lbs./per acre. Treatment is accomplished by pouring 70 ml. of a 2000 p.p.m. test formulation (2000 p.p.m. test chemical—5% acetone—0.01% Triton X–155—balance water) on the surface of the soil. This is allowed to stand until the next day when the soil is removed from each box and thoroughly mixed before being replaced in the box. Three days after treatment, 25 pea seeds, variety Perfection, are planted to a uniform depth per box. Untreated checks are included in each test in addition to a check planted in sterilized soil. Percentage stand compared to untreated soil is recorded 14 days after planting, results being given in Table I.

TABLE I

*Fungicidal activity of compounds within the scope of the invention*

[TEST]

| Compound | A | | B | | C |
|---|---|---|---|---|---|
| | A. oleracea | M. fructicola | E. blight | L. blight | Seed Protection |
| alpha,alpha'-diiodo-p-xylene | | | | 100 | 84 |
| alpha,alpha'-dithio-cyano-p-xylene | | | 99 | 100 | |
| alpha,alpha'-dibromo-p-xylene | AA | AA | 100 | 95 | |
| alpha,alpha'-dibromo-m-xylene | AA | AA | | | |
| alpha,alpha'-diiodo-m-xylene | AA | AA | | | |
| alpha,alpha'-dithio-cyano-m-xylene | | | 95 | | |
| alpha,alpha'-dibromo-o-xylene | AA | AA | 70 | | |
| alpha,alpha'-diiodo-o-xylene | AA | AA | 99 | | |
| alpha,alpha'-dithio-cyano-o-xylene | | | 100 | | |
| alpha,alpha'-dichloro-m-xylene | AA | AA | | | |
| alpha,alpha,alpha'-trichloro-p-xylene | | | | | 92 |
| 2-bromo-p-xylene | | AA | | | |
| 2,4-dichloro-m-xylene | AA | AA | | | |

The term "bactericide" is intended to refer broadly to a composition of matter effective in controlling or killing, collectively or selectively, bacteria (*Schizomycetes*), e.g., *Erwenia*, *Escherichia*, *Xanthamonas* and *Staphylococcus*. It is preferred that the bacteria be contacted with a bactericidal amount of the composition of the present invention. In order to demonstrate the bactericidal activity of the compounds of this invention a test is run evaluating bactericidal effectiveness against the bacteria, *Erwenia amylovora*, *Xanthamonas phaseoli*, *Staphylococcus aureus* and *Escherichia coli*.

The procedure used in these evaluations is:

The test chemical at a concentration of 1000 p.p.m. is mixed with distilled water containing 5% acetone and 0.01% Triton X–155. 5 ml. of the test formulation is placed in each of 4 test tubes. To each tube is added one of the organisms: *Erwenia amylovora*, *Xanthomonas phaseolia*, *Staphylococcus aureus* and *Escherichia coli* in the form of a bacterial suspension in a saline solution from potato-dextrose agar plates. The tubes are then incubated for 4 hours at 30° C. Transfers are then made to sterile broth with a standard 4 mm. loop and the thus-inoculated broth is incubated for 48 hours at 38° C. when growth is rated.

The results and data collected from this evaluation are listed in Table II. The data indicates percent bacterial growth control with ratings from 0 for from 0–25% growth inhibition, 1 for from 25–50% growth inhibition, 2 for from 50–75% inhibition, to 3 for from 75–100% growth inhibition.

TABLE II

*Bactericidal activity of compounds within the scope of structure I*

[TEST]

| Compound | Erwenia amylovora | Xanthomonas phaseoli | Staphylococcus aureus | Escherichia coli |
|---|---|---|---|---|
| alpha,alpha'-dibromo-p-xylene | 1 | 2 | 1 | 2 |
| alpha,alpha'-dibromo-m-xylene | 3 | 3 | 3 | 3 |
| alpha,alpha'-dibromo-o-xylene | 1 | 3 | 3 | 3 |

It is to be understood that although the invention has been described with specific reference to the particular embodiments thereof, it is not to be so limited since changes and alterations therein may be made which are in the full intended scope of this invention as defined by the appended claims.

What is claimed is:

1. The method of controlling bacterial growth which comprises contacting said bacteria with a bactericidal amount of a compound selected from the group consisting of alpha,alpha'-diiodo-p-xylene; alpha,alpha'-dithiocyano-p-xylene; alpha,alpha'-dibromo-p-xylene; alpha,alpha'-dibromo-m-xylene; alpha,alpha'-diiodo-m-xylene; alpha,alpha'-dithiocyano-m-xylene; alpha,alpha'-dibromo-o-xylene; alpha,alpha'-diiodo-o-xylene; alpha,alpha'-dithiocyano-o-xylene; alpha,alpha'-dichloro-m-xylene; alpha,alpha,alpha'-trichloro-p-xylene; 2-bromo-p-xylene; and 2,4-dichloro-m-xylene.

2. The method of controlling bacterial growth which comprises contacting said bacteria with a bactericidal amount of alpha,alpha'-diiodo-p-xylene.

3. The method of controlling bacterial growth which comprises contacting said bacteria with a bactericidal amount of alpha,alpha'-dithiocyano-p-xylene.

4. The method of controlling bacterial growth which comprises contacting said bacteria with a bactericidal amount of alpha-alpha'-dibromo-p-xylene.

5. The method of controlling bacterial growth which comprises contacting said bacteria with a bactericidal amount of alpha,alpha'-dibromo-m-xylene.

6. The method of controlling bacterial growth which comprises contacting said bacteria with a bactericidal amount of alpha,alpha'-diiodo-m-xylene.

7. The method of controlling bacterial growth which comprises contacting said bacteria with a bactericidal amount of alpha,alpha'-dithiocyano-m-xylene.

8. The method of controlling bacterial growth which comprises contacting said bacteria with a bactericidal amount of alpha,alpha'-dibromo-o-xylene.

9. The method of controlling bacterial growth which comprises contacting said bacteria with a bactericidal amount of alpha,alpha'-diiodo-o-xylene.

10. The method of controlling bacterial growth which comprises contacting said bacteria with a bactericidal amount of alpha,alpha'-dithiocyano-o-xylene.

11. The method of controlling bacterial growth which comprises contacting said bacteria with a bactericidal amount of alpha,alpha'-dichloro-m-xylene.

12. The method of controlling bacterial growth which comprises contacting said bacteria with a bactericidal amount of alpha,alpha,alpha'-trichloro-p-xylene.

13. The method of controlling bacterial growth which comprises contacting said bacteria with a bactericidal amount of 2-bromo-p-xylene.

14. The method of controlling bacterial growth which comprises contacting said bacteria with a bactericidal amount of 2,4-dichloro-m-xylene.

References Cited in the file of this patent

UNITED STATES PATENTS

| | | |
|---|---|---|
| 2,477,978 | Graenacher | Aug. 2, 1948 |
| 2,826,531 | Norris | Mar. 11, 1958 |

OTHER REFERENCES

Horsfall: Fungicides and Their Action, vol. II (1945), p. 151.

King: U.S. Dept. Agr. Handbook No. 69, 1954, p. 334.

Frear: A Catalogue of Insecticides and Fungicides, 1947, vol. I, pp. 76, 161, 162 and 163; vol. II, p. 48.